United States Patent
Cheng et al.

(10) Patent No.: US 9,778,787 B2
(45) Date of Patent: Oct. 3, 2017

(54) TOUCH DISPLAY DEVICE

(71) Applicant: Innolux Corporation, Miao-Li County (TW)

(72) Inventors: Pai-Tsun Cheng, Miao-Li County (TW); Huai-Chin Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/172,275

(22) Filed: Jun. 3, 2016

(65) Prior Publication Data
US 2016/0364068 A1 Dec. 15, 2016

(30) Foreign Application Priority Data

Jun. 12, 2015 (TW) .............................. 104119089 A

(51) Int. Cl.
*G06F 3/041* (2006.01)
*G09G 3/00* (2006.01)
*G06F 3/044* (2006.01)
*G09G 3/36* (2006.01)

(52) U.S. Cl.
CPC ............ *G06F 3/0416* (2013.01); *G06F 3/044* (2013.01); *G06F 3/0412* (2013.01); *G09G 3/006* (2013.01); *G06F 2203/04103* (2013.01); *G09G 3/3648* (2013.01)

(58) Field of Classification Search
None
See application file for complete search history.

(56) References Cited

U.S. PATENT DOCUMENTS

| 2007/0170949 | A1* | 7/2007 | Pak | G09G 3/006 324/760.01 |
| 2008/0170195 | A1* | 7/2008 | Kwon | G02F 1/1309 349/143 |
| 2016/0293077 | A1 | 10/2016 | Ma | |
| 2016/0351093 | A1* | 12/2016 | Kim | G09G 3/2092 |

FOREIGN PATENT DOCUMENTS

CN 104698637 A 6/2015

OTHER PUBLICATIONS

TIPO Office Action dated Aug. 18, 2016 in corresponding Taiwan application (No. 104119089).

* cited by examiner

*Primary Examiner* — Nicholas Lee
(74) *Attorney, Agent, or Firm* — McClure, Qualey & Rodack, LLP

(57) ABSTRACT

A touch display device including multiple data lines, multiple scan lines and a substrate is provided. The data lines and the scan lines are formed on the substrate. The touch display device includes multiple pixel elements arranged in the form of a pixel array and coupled to the corresponding data lines and the corresponding scan lines and multiple touch sensor electrodes arranged in the form of a sensor array. The touch display device further includes a touch gate pad formed on the substrate and multiple first switch transistors. Each first switch transistors includes a first end, a second end and a control end. The first end is coupled to one of the touch sensor electrodes in a first column of the touch sensor electrodes, and a touch display driver. The second end is coupled to a first test pad. The control end is coupled to the touch gate pad.

10 Claims, 9 Drawing Sheets

TOUCH DISPLAY DEVICE

This application claims the benefit of Taiwan application Serial No. 104119089, filed Jun. 12, 2015, the disclosure of which is incorporated by reference herein in its entirety.

TECHNICAL FIELD

The disclosure relates in general to a touch display device, and more particularly to a touch display device capable of testing the touch sensor electrodes.

BACKGROUND

Since the current embedded touch display device is incapable of testing touch sensor electrodes, the rear end modules will have lower conformity rates and manufacturing costs will be increased. Therefore, the industries need to provide a method for testing the touch sensor electrodes without increasing circuit complexity, so that the test can be performed more quickly and more conveniently, and the conformity rate of the touch display device can be increased.

SUMMARY

According to one embodiment, a touch display device including a plurality of data lines, a plurality of scan lines and a substrate is provided. The data lines and the scan lines are formed on the substrate. The touch display device further includes a plurality of pixel elements arranged in the form of a pixel array and coupled to the corresponding data lines and the corresponding scan lines. The touch display device further includes a plurality of touch sensor electrodes arranged in the form of a sensor array. The touch display device further includes a touch gate pad formed on the substrate, and a plurality of switch transistors. Each first switch transistor includes a first end, a second end and a control end. The first end of each first switch transistor is coupled to one of the touch sensor electrodes in a first column of the touch sensor electrodes and a touch display driver. The second end of each first switch transistor is coupled to a first test pad. The control end of each first switch transistor is coupled to the touch gate pad.

According to another embodiment, a touch display device including a plurality of data lines, a plurality of scan lines and a substrate is provided. The data lines and the scan lines are formed on the substrate. The touch display device further includes a plurality of pixel elements arranged in the form of a pixel array and coupled to the corresponding data lines and the corresponding scan lines. The touch display device further includes a plurality of touch sensor electrodes arranged in the form of a sensor array. The touch display device further includes a touch gate pad formed on the substrate, and a plurality of first group of switch transistors. Each first group switch transistor includes a first end, a second end and a control end. The first end of each first group switch transistor is coupled to a touch sensor electrode in the first group of a first column of the touch sensor electrodes, and a touch display driver. The second end of each first group switch transistor is coupled to a first test pad. The control end of each first group switch transistor is coupled to a touch gate pad.

The above and other aspects of the invention will become better understood with regard to the following detailed description of the preferred but non-limiting embodiment(s). The following description is made with reference to the accompanying drawings.

Figure 1:
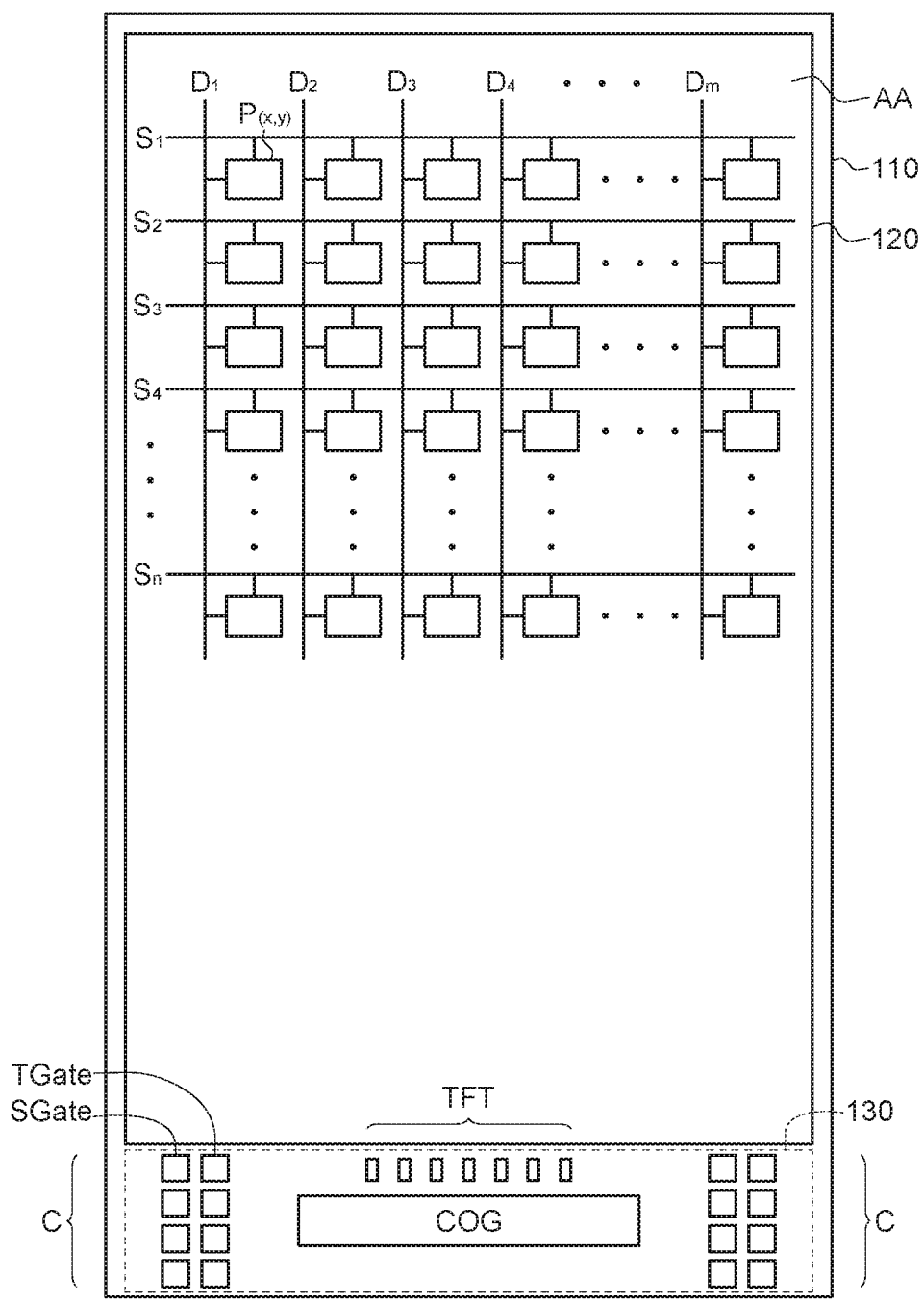
FIG. 1 shows a block diagram of a touch display device 100 according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
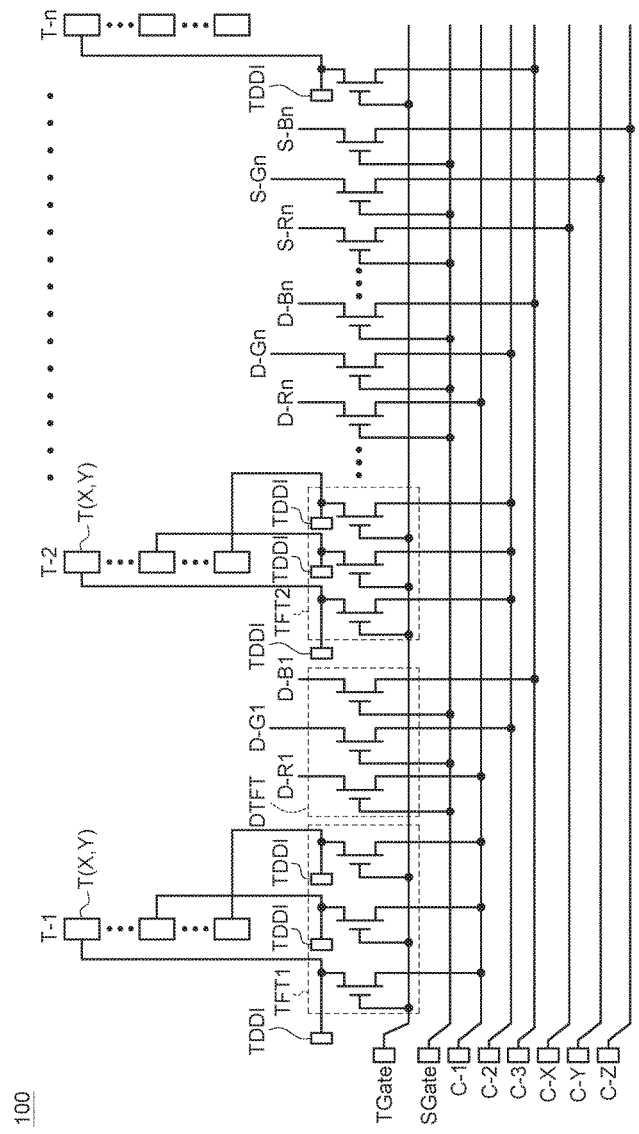
FIG. 2 shows a circuit diagram of a touch display device 100 according to an embodiment of the present disclosure.

Refer to FIG. 1 and FIG. 2. FIG. 1 shows a block diagram of a touch display device 100 according to an embodiment of the present disclosure. FIG. 2 shows a circuit diagram of a touch display device 100 according to an embodiment of the present disclosure. The touch display device 100 includes an LCD module 110, a plurality of data lines D1~Dm and a plurality of scan lines S1~Sn formed in an active region AA of a substrate 120. The active region AA further includes a plurality of pixel elements P (x,y) arranged in the form of a pixel array and coupled to the corresponding data lines and the corresponding scan lines. The LCD module 110 further includes a touch gate pad TGate and a plurality of switch transistors TFT. The LCD module 110 further includes a display gate pad SGate of a display transistor and a plurality of test pads C formed on a glass substrate 130. The LCD module 110 further includes a chip-on-glass COG formed on the glass substrate 130. The glass substrate 130 and the substrate 120 can be realized by the same substrate. The chip-on-glass COG can be realized by such as a touch with display driver or a touch and display driver integration (TDDI).

As indicated in FIG. 2, the LCD module 110 further includes a plurality of touch sensor electrodes T(x,y) arranged in the form of a sensor array. The touch sensor electrodes T(x,y), such as an embedded touch electrode structure, can be integrated with the pixel elements P (x,y) and together formed on the substrate 120. For example, common electrodes (common ITO) of the pixel elements P (x,y) can be patterned and used as touch sensor electrodes T(x,y). The touch sensor electrodes T(x,y) can be realized by a self-capacitance touch configuration or a mutual-capacitance touch configuration. FIG. 2 is exemplified by a self-capacitance touch configuration. A plurality of switch transistors TFT is disposed outside the active region AA, wherein each first switch transistor TFT1 (corresponding to the touch sensor electrode T-1 in the first column) includes a first end, a second end and a control end. The first end of the first switch transistor TFT1 corresponding to the touch sensor electrode T-1 in the first column is coupled to one of the touch sensor electrodes T-1 in the first column and one of a plurality of pins of the touch display driver TDDI. The second end of each first switch transistor TFT1 is coupled to the first test pad, and the control end of the first switch transistors is coupled to the touch gate pad TGate. The first test pad is a test pad used in the LCD light-on test and can be realized by any one of the test pads C-1 to C-Z of FIG. 2.

For example, the data lines of the touch display device can be divided into a first group, a second group and a third group, such as red data lines D-Rn, green data lines D-Gn and blue data lines D-Bn, respectively. During the LCD light-on test, each display switch transistor DTFT includes a first end, a second end and a control end. The display switch transistors DTFT are respectively coupled to the corresponding red data lines D-R1~D-Rn (columns 1~n), the corresponding green data lines D-G1~D-Gn (columns 1~n) or the corresponding blue data lines D-B1~D-Bn (columns 1~n) of the pixel elements P (x,y), and a test pad C-1 corresponding to the red data lines, a test pad C-2 corresponding to the green data lines or a test pad C-3 corresponding to the blue data lines. The control end of each display switch transistor DTFT is coupled to the display gate pad SGate of the display transistor. During the LCD light-on test, a display test signal is transmitted to the display switch transistors DTFT from the display gate pad SGate of the display transistor in a display test period to test the red data line D-Rn, the green data line D-Gn and the blue data line D-Bn. To make the diagram easier to understand, the pixel elements P (x,y) are not illustrated in FIG. 2, and the test pads C-1 to C-3 of FIG. 1 are disposed on two sides of the chip-on-glass COG (also referred as TDDI) of the substrate 120 and electrically connected to the chip-on-glass COG (not illustrated) through the wires. In an embodiment, the touch display device further includes a red scan line S-Rn, a green scan line S-Gn and a blue scan line S-Bn. The touch display device can include a plurality of switch transistors respectively coupled to the red scan line S-Rn, the green scan line S-Gn or the blue scan line S-Bn and the test pad C-X corresponding to the red scan line, the test pad C-Y corresponding to the green scan line or the test pad C-Z corresponding to the blue scan line, and the control end of each first switch transistor is coupled to the display gate pad SGate of the display transistor.

In some embodiments, the first test pad coupled to the first switch transistor corresponding to the touch sensor electrode T-1 in the first column can be used as one of the test pad C-1 corresponding to the red data lines, the test pad C-2 corresponding to the green data lines and the test pad C-3 corresponding to the blue data lines. In the present embodiment, the first switch transistor is coupled to the test pad C-1 corresponding to the red data lines to transmit a touch test signal to the first switch transistor corresponding to the touch sensor electrode T-1 in the first column from the touch gate pad TGate in a touch test period to test the touch sensor electrode T-1 in the first column.

In some embodiments, the touch display device further includes a plurality of second switch transistors TFT2 corresponding to the touch sensor electrodes T-2 in the second column. Each second switch transistor includes a first end, a second end and a control end. The first end and the second end of each second switch transistor are respectively coupled to one of the touch sensor electrodes T-2 in the second column and one of the pins of the touch display driver TDDI, wherein the pin belongs to a TDDI different from the TDDI to which the first end of the first switch transistor TFT1 is connected. The second end of each second switch transistor TFT2 is coupled to a second test pad. In the present example, the second test pad is exemplified by a test pad C-2 corresponding to the green data lines, and the control end of each second switch transistor is coupled to the touch gate pad TGate. The second test pad is a test pad used in the LCD light-on test and can be realized by such as any one of the test pads C-1 to C-Z of FIG. 2 but must be different from the said first test pad. That is, if the first test pad is the test pad C-1, then the second test pad can only be selected from one of the test pads C-2 to C-Z.

In some embodiments, the touch display device further includes a plurality of third switch transistors (not illustrated) adjacent to the touch sensor electrodes T-2 in the second column and corresponding to the touch sensor electrodes T-3 in the third column. Each third switch transistor also includes a first end, a second end and a control end. The first end and the second end of each third switch transistor are respectively coupled to one of the touch sensor electrodes T-3 in the third column and one of a plurality of pins of the touch display driver TDDI. The second end of each third switch transistor TFT3 is coupled to a third test pad. In the present example, the third test pad is exemplified by a test pad C-3 corresponding to the blue data lines. The control end of each third switch transistor is coupled to the touch gate pad TGate. The third test pad can be realized by any one of the test pads C-1~C-Z of FIG. 2 but must be different from the second test pad. That is, if the first test pad is C-1 and the second test pad is C-2, then the second test pad can only be selected from one of the test pads C-3 to C-Z.

Figure 3A:
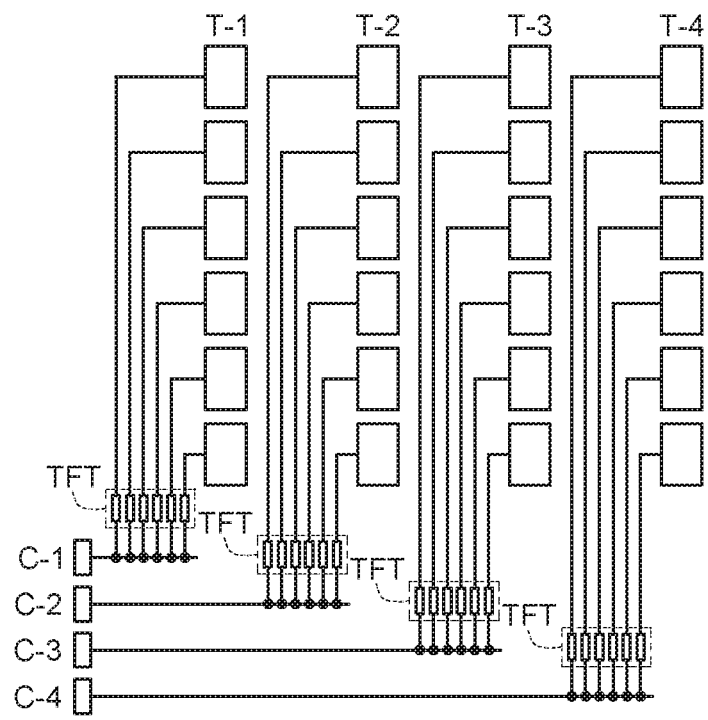
FIGS. 3A and 3B show schematic diagrams of connecting switch transistors to test pads according to two embodiment of the present disclosure.

In some embodiments, the switch transistor corresponding to the touch sensor electrode T-1 in the first column can be coupled to one of the test pads C-1, C-2, C-3, C-X, C-Y and C-Z, and the switch transistor corresponding to the touch sensor electrode T-2 in the second column can be coupled to another one of the test pads C-1, C-2, C-3, C-X, C-Y and C-Z, and the correspondence relationship of the remaining switch transistors can be obtained by the same analogy. Refer to FIG. 3A, a schematic diagram of connecting switch transistors to test pads according to an embodiment of the present disclosure is shown. As indicated in FIG. 3A, the touch sensor electrode T-1 in the first column is coupled to the test pad C-1 through a plurality of switch transistors TFT, the touch sensor electrode T-2 in the second column is coupled to the test pad C-2 through a plurality of switch transistor TFT, the touch sensor electrode T-3 in the third column is coupled to the test pad C-3 through a plurality of switch transistors TFT, the touch sensor electrode T-4 in the fourth column is coupled to the test pad C-4 through a plurality of switch transistors TFT, and the correspondence relationship of the remaining switch transistors can be obtained by the same analogy. In the present embodiment, the touch sensor electrodes in the same column can share the same test pad, and the test pads used by the touch sensor electrodes in different columns are not the same.

Figure 3B:
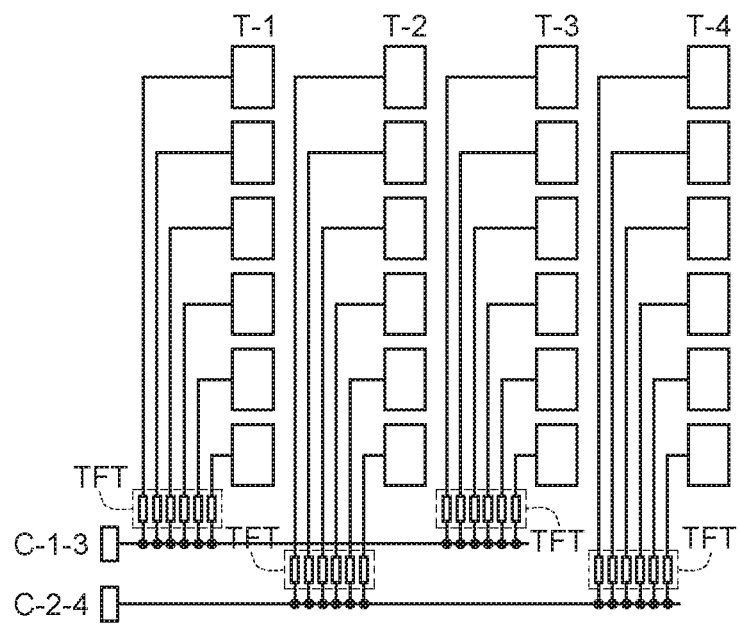

In another embodiment, if the test pads are not enough, then every two columns can share the same test pad. Refer to FIG. 3B, a schematic diagram of connecting switch transistors to test pads according to another embodiment of the present disclosure is shown. As indicated in FIG. 3B, the touch sensor electrodes T-1 in the first column and the touch sensor electrode T-3 in the third column is coupled to the test pad C-1-3 through a plurality of switch transistors TFT, the touch sensor electrode T-2 in the second column and the touch sensor electrodes T-4 in the fourth column is coupled to the test pad C-2-4 through a plurality of switch transistors TFT, and the correspondence relationship of the remaining switch transistors can be obtained by the same analogy. Under such arrangement, more touch sensor electrodes can be tested by using fewer test pads. Each switch transistor TFT of FIGS. 3A and 3B actually has corresponding pins connected to the touch display driver TDDI. However, to make FIGS. 3A and 3B easier to understand, the corresponding pins are not illustrated.

Figure 4A:
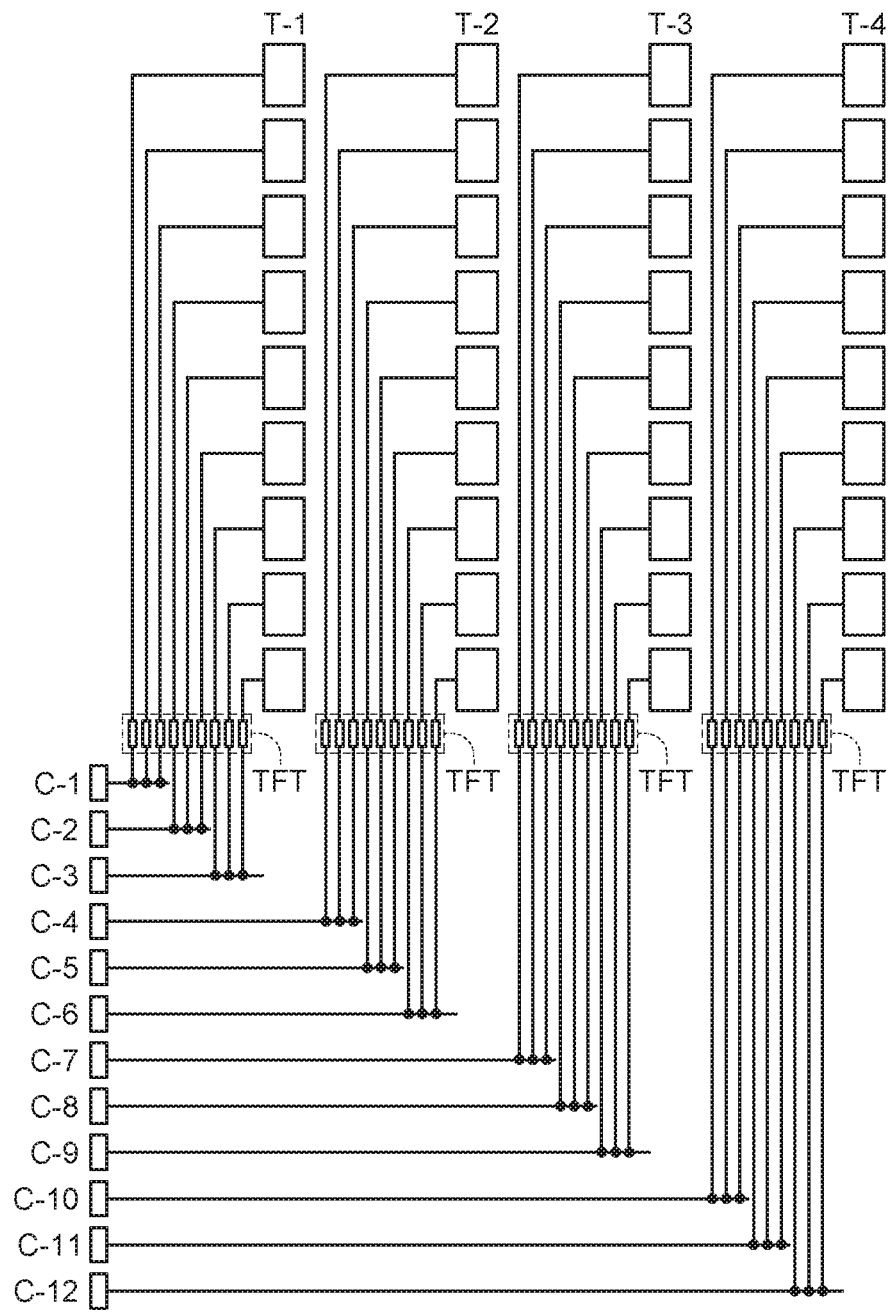
FIG. 4A shows a schematic diagram of connecting switch transistors to test pads group by group according to an embodiment of the present disclosure.
Figure 4B:
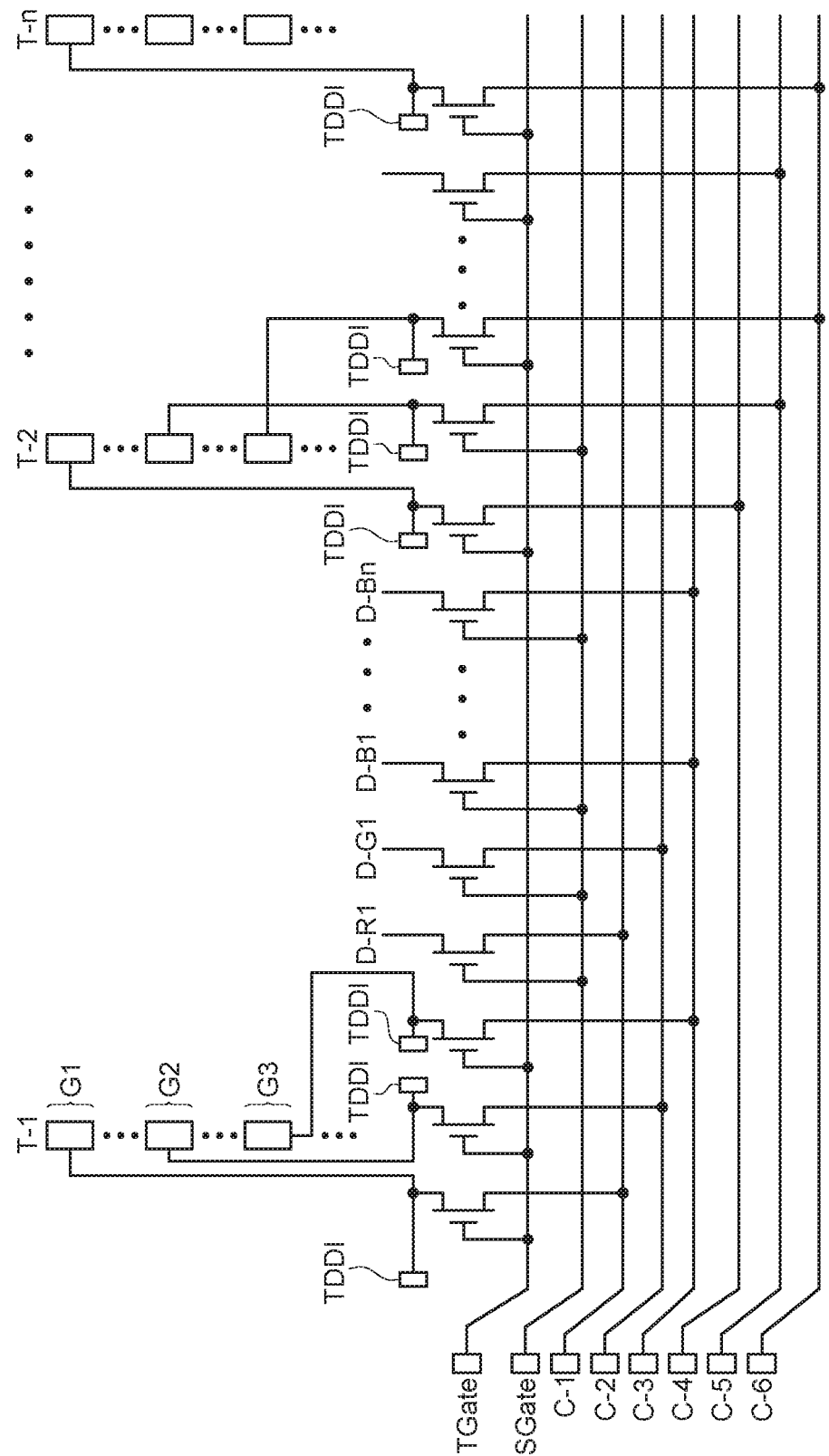
FIG. 4B shows a schematic diagram of connecting switch transistors to test pads according to another embodiment of the present disclosure.

However, the present disclosure is not limited to the above exemplifications. FIG. 4A shows a schematic diagram of connecting switch transistors to test pads group by group according to an embodiment of the present disclosure. FIG. 4B shows a schematic diagram of connecting switch transistors to test pads according to another embodiment of the present disclosure. In other embodiments, the touch sensor electrodes in a column can be divided into groups, such as 3 groups, and each group is composed of corresponding switch transistors. For example, suppose the first column has 9 touch sensor electrodes. The 3 touch sensor electrodes corresponding to the first group G1, such as touch sensor electrodes T(1,1)-T(1,3), have 3 switch transistors, the first end of each of the 3 switch transistors is coupled to a corresponding one of the touch sensor electrodes T(1,1)-T(1,3) in the first group of the first column and a corresponding pin of the touch display driver TDDI, and the second end of each of the 3 switch transistors is coupled to the same test pad C-1. Similarly, the 3 touch sensor electrodes corresponding to the second group G2, such as touch sensor electrodes T(1,4)-T(1,6), have 3 switch transistors, the first end of each of the 3 switch transistor is coupled to a corresponding one of the touch sensor electrodes T(1,4)-T(1,6) in a second group of the first column and a corresponding pin of the touch display driver TDDI, and the second end of each of the 3 switch transistors is coupled to the same test pad C-2. The 3 touch sensor electrodes corresponding to the third group G3, such as touch sensor electrodes T(1,7)-T(1,9), have 3 switch transistors, the first end of each of the 3 switch transistors is coupled to a corresponding one of the touch sensor electrodes T(1,7)-T(1,9) in a third group of the first column and a corresponding pin of the touch display driver TDDI, and the second end of each of the 3 switch transistors is coupled to the same test pad C-3.

Alternatively, the first group can be composed of the touch sensor electrodes T(1,1), T(1,4), T(1,7), the second group can be composed of the touch sensor electrodes T(1,2), T(1,5), T(1,8), and the third group can be composed of the touch sensor electrodes T(1,3), T(1,6), T(1,9), and the switch transistors corresponding to the 3 groups are coupled to the test pads C-1, C-2 and C-3, respectively. That is, based on actual needs, the touch sensor electrodes in a column can be divided into groups and then tested group by group, such that the location of erroneous touch sensor electrode can be obtained to help the analysis of the conformity rate of the touch sensor electrodes.

Figure 5:
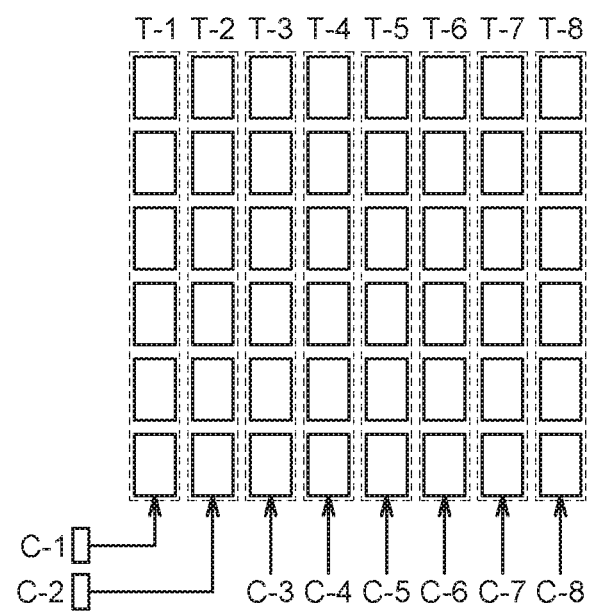
FIG. 5 shows a schematic diagram of a self-capacitance touch configuration.
Figure 6:
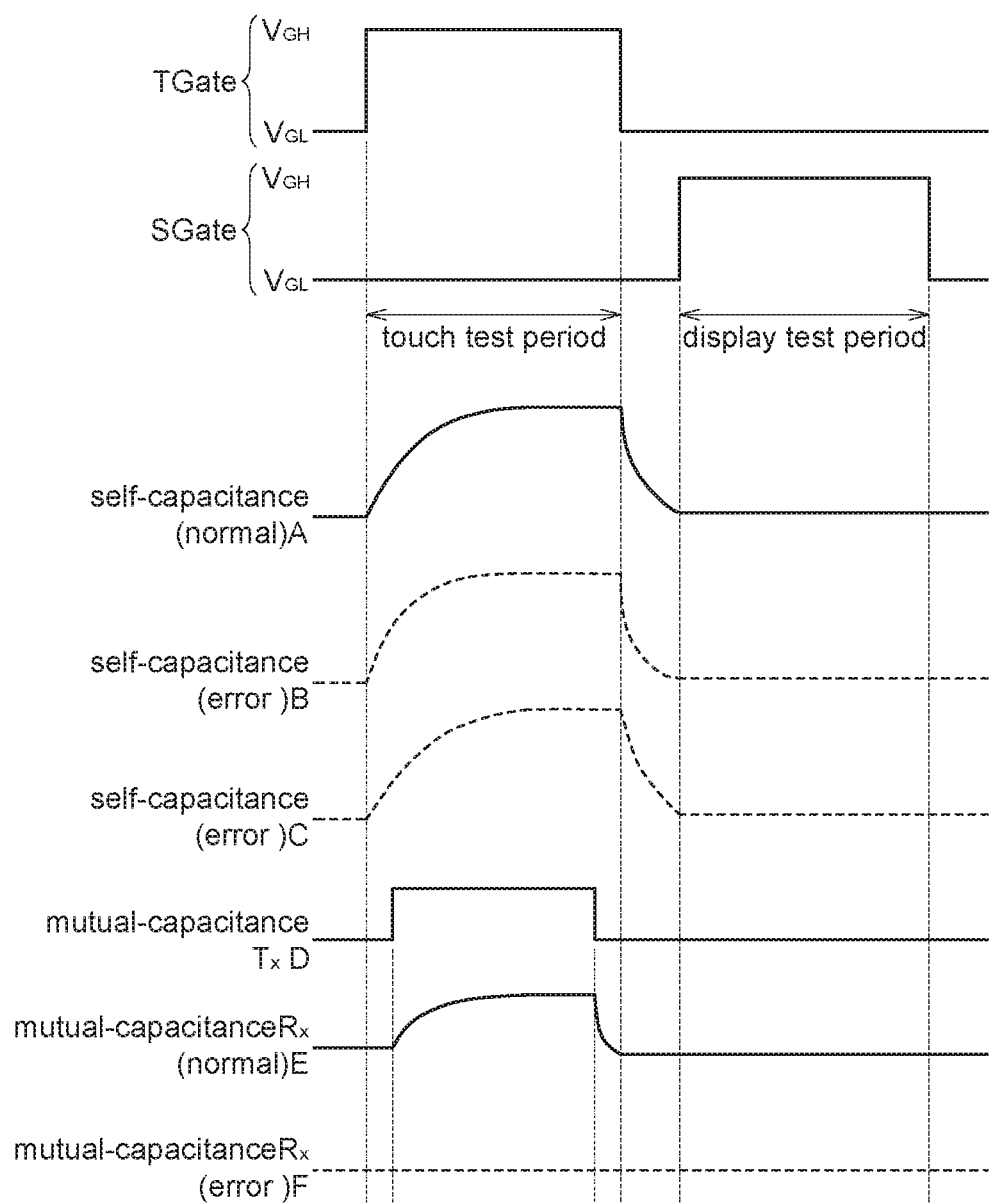
FIG. 6 shows a timing diagram of performing the test of the self-capacitance touch configuration of FIG. 5.

The method for testing touch sensor electrodes is exemplified with a number of examples below. Refer to FIG. 5 and FIG. 6. FIG. 5 shows a schematic diagram of a self-capacitance touch configuration. FIG. 6 shows a timing diagram of testing the self-capacitance touch configuration of FIG. 5. The self-capacitance touch configuration uses a column (T-1 to T-8) as a unit, and different units can be coupled to different test pads respectively. For example, the touch sensor electrode T-1 in the first column and the touch sensor electrode T-2 in the second column are coupled to the test pad C-1 and the test pad C-2 respectively. As indicated in the self-capacitance touch configuration of FIG. 5, the self-capacitance logic test or the mutual-capacitance logic test can be performed column by column. As indicated in FIG. 6, in a touch test period, the touch gate pad TGate transmits a high level touch test signal VGH to test the touch sensor electrode. Meanwhile, the display test signal is at low level VGL, and does not perform the display test. Afterwards, in a display test period, the display gate pad SGate of the display transistor transmits a high level display test signal VGH to perform the LCD light-on test. Meanwhile, the touch test signal is at low level VGL, and does not perform the touch test. To make the diagram easier to understand, the circuit including the touch gate pad TGate, the display gate pad SGate, the switch transistors and the pins of the touch display driver TDDI is omitted, but the design of the circuit omitted here is the same as that in previous embodiments.

When the test is performed by using the self-capacitance logic, (for example, the switch transistor corresponding to the touch sensor electrode in the first column is turned on to detect the sensing signal of the touch electrode in the first column), normal sensing wave-pattern is represented in a solid line A. If the touch sensor electrode in the first column has defects (such as open circuit or short circuit), the detected sensing wave-pattern, represented in dotted line B or dotted line C, is erroneous. In comparison to normal sensing wave-pattern, the dotted wave-pattern B has a faster charge/discharge rate. Or, the charge/discharge rate of the detected sensing wave-pattern, such as the sensing wave-pattern C, is slower than that of normal sensing wave-pattern. Or, the voltage of the detected sensing wave-pattern is higher/lower than that of the sensing wave-pattern. In some embodiments, the touch sensing test can be repeated for many times. After the results are accumulated and averaged, the averaged results are further compared with the results obtained from normal sensing wave-pattern to obtain a more accurate comparison.

In another embodiment, when the test is performed by using the mutual-capacitance logic (for example, the touch sensor electrode T-1 in the first column is used as a transmission end Tx for transmitting a testing signal D, and the touch sensor electrode T-2 in the second column is used as a reception end RX for receiving a sensing signal), normal sensing wave-pattern is represented by a solid line E. If the test pad does not receive any signals, as indicated in the dotted line wave-pattern F of FIG. 6, it is possible that the reception end RX is in an open state and is therefore determined as error. Furthermore, when the signals received by adjacent test pads have different voltage levels, two neighboring columns may be short circuited and are determined as error.

Figure 7:
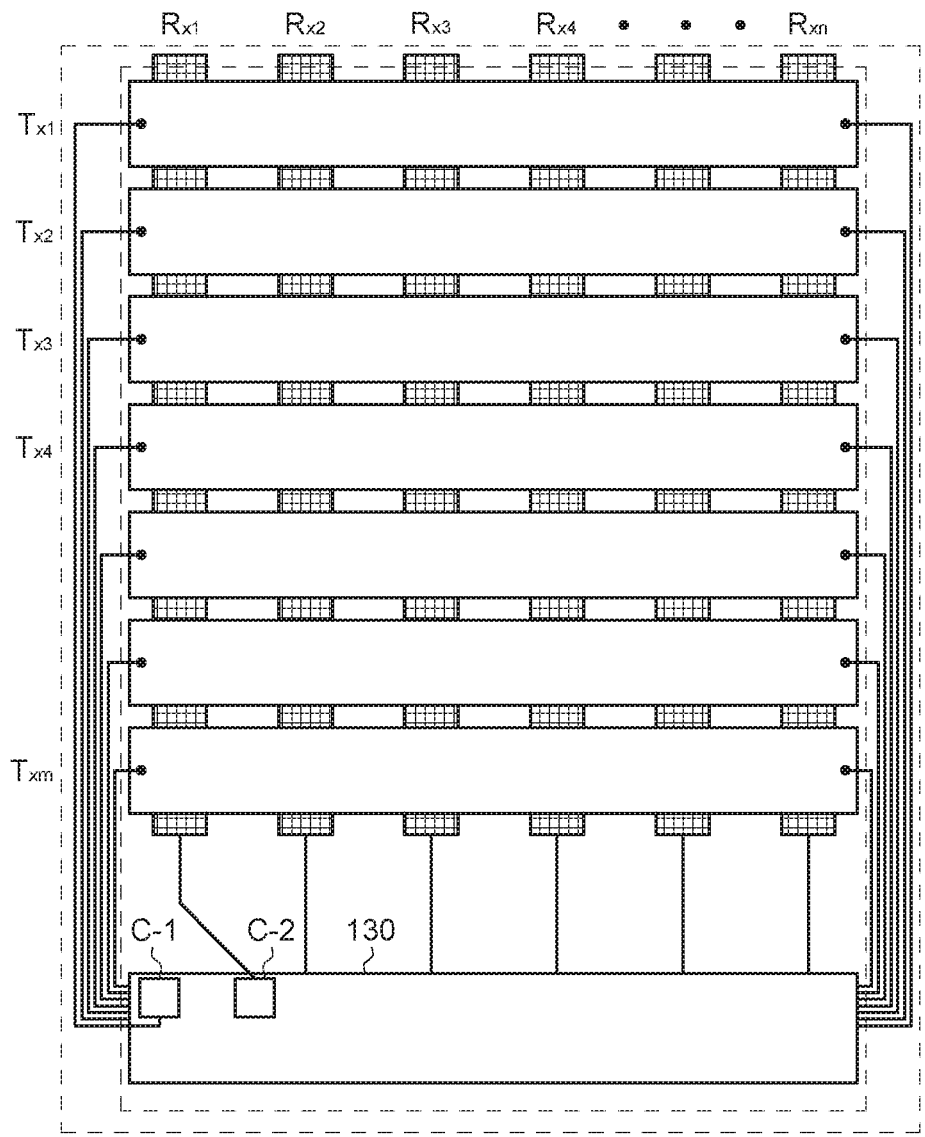
FIG. 7 shows a schematic diagram of a mutual-capacitance touch configuration.
Figure 8:
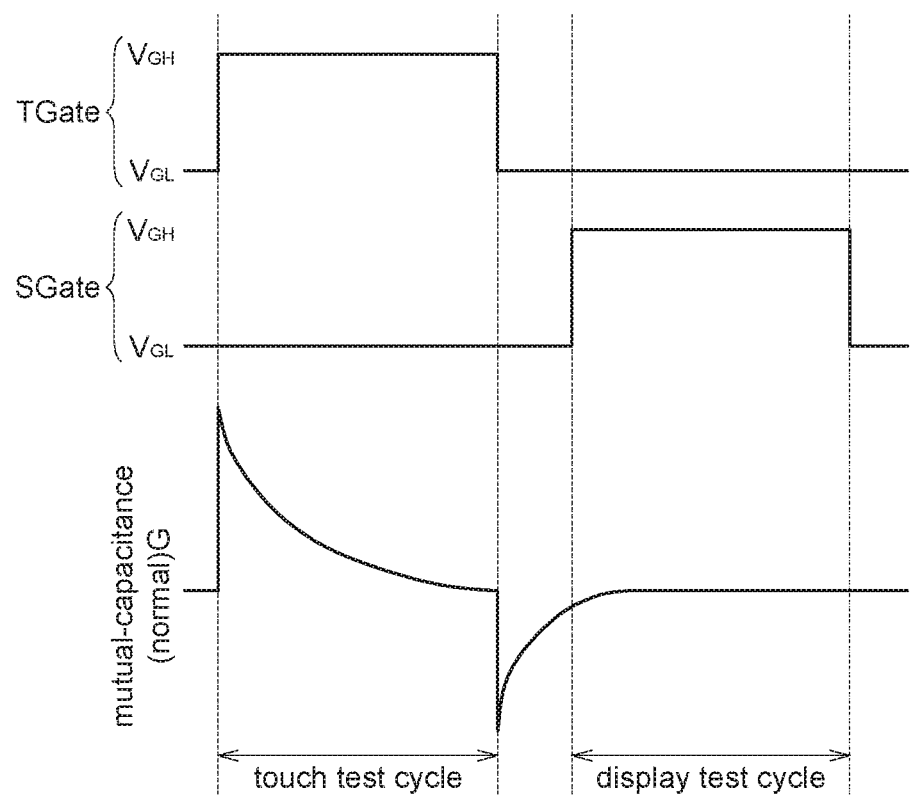
FIG. 8 shows a timing diagram of performing the test of the mutual-capacitance touch configuration of FIG. 7.

Refer to FIG. 7 and FIG. 8. FIG. 7 shows a schematic diagram of a mutual-capacitance touch configuration. FIG. 8 shows a timing diagram of testing the mutual-capacitance touch configuration of FIG. 7. The mutual-capacitance touch configuration uses 1 row of touch sensor electrodes coupled to the test pad C-1 as the transmission end, such as a transmission end Tx1, for transmitting a testing signal, and uses 1 column of touch sensor electrodes coupled to the test pad C-2 as a reception end, such as the reception end Rx1, for receiving a sensing signal. The method for testing the transmission ends Tx2~Txm and the reception ends Rx2-Rxn can be obtained by analogy. For example, the transmission ends Tx2-Txm are coupled to the test pads C-11, C-12, . . . C-1m respectively, and the reception ends Rx2~Rxn are coupled to the test pad C-21, C-22, . . . C-2n respectively (not illustrated). As indicated in the mutual-capacitance touch configuration of FIG. 7, the self-capacitance logic test or the mutual-capacitance logic test can be performed by using the transmission ends Tx1-Txm and the reception ends Rx1~Rxn. Similarly, as indicated in FIG. 8, in a touch test period, the touch gate pad TGate transmits a high level touch test signal VGH to test the touch sensor electrode. Then, in a display test period, the display gate pad SGate transmits a high level display test signal VGH to light up the LCD. Normal sensing wave-pattern is represented by a solid line G. Similarly, the sensing signal with other voltage levels and the wave-pattern of the sensing signal with faster/slower charge rate can all be determined as errors. To make the diagram easier to understand, the circuit including the touch gate pad TGate, the display gate pad SGate, the switch transistors and the pins of touch display driver TDDI is omitted, and the design of the circuit omitted here is the same as that of previous embodiments.

According the touch display device disclosed in above embodiments, a plurality of switch transistors are coupled to the touch sensor electrode in a column and a test pad of the touch display device for performing the LCD light-on test, and a testing signal is transmitted from a touch gate pad to test the touch sensor electrode, such that the test of touch sensor electrode can be performed more quickly and conveniently, manufacturing cost can be reduced and the conformity rate of the touch sensor electrodes can be increased. Besides, the test circuit of the present disclosure has a simple structure, such that the test can be performed without increasing circuit complexity. In the present disclosure, a plurality of switch transistors coupled to the touch sensor electrodes in a column can be divided into groups, such that different groups are coupled to different test pads respectively, the information of the defect or damaged area of the touch sensor electrodes can be obtained to help the analysis of conformity rate of the manufacturing process.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch display device, comprising:
   a plurality of data lines;
   a plurality of scan lines;
   a substrate on which the data lines and the scan lines are formed;
   a plurality of pixel elements arranged in the form of a pixel array and coupled to the corresponding data lines and the corresponding scan lines;
   a plurality of touch sensor electrodes arranged in the form of a sensor array;
   a touch gate pad formed on the substrate; and
   a first switch transistor comprising a first end, a second end and a control end, wherein the first end of the first switch transistor is coupled to one of the touch sensor electrodes in a first column of the sensor array and a touch display driver, the second end of the first switch transistor is coupled to a first test pad, and the control end of the first switch transistor is coupled to the touch gate pad.

2. The touch display device according to claim 1, further comprising:
   a second switch transistor comprising a first end, a second end and a control end, wherein the first end of the second switch transistor is coupled to one of the touch sensor electrodes in a second column of the sensor array and the touch display driver, the second end of the second switch transistor is coupled to a second test pad, and the control end of the second switch transistor is coupled to the touch gate pad.

3. The touch display device according to claim 2, further comprising:
   a third switch transistor comprising a first end, a second end and a control end, wherein the first end of the third switch transistor is coupled to one of the touch sensor electrodes in a third column of the sensor array and the touch display driver, the second end of the third switch transistor is coupled to a third test pad, and the control end of the third switch transistor is coupled to the touch gate pad.

4. The touch display device according to claim 1, wherein the data lines comprise a first group, a second group and a third group, and the touch display device further comprises:
   a display gate pad; and
   a display switch transistor comprising a first end, a second end and a control end, wherein the first end of the display switch transistor is coupled to one of the data lines in the first group, one of the data lines in the second group or one of the data lines in the third group, the second end of the display switch transistor is coupled to the first test pad corresponding to the first group, a second test pad corresponding to the second group, or a third test pad corresponding to the third group, and the control end of the display switch transistor is coupled to the display gate pad.

5. The touch display device according to claim 1, wherein the touch gate pad transmits a touch test signal to the first switch transistor in a first period to test one of the touch sensor electrode in the first column, and the display gate pad transmits a display test signal to the display switch transistor in a second period to test one of the data lines.

6. A touch display device, comprising:
   a plurality of data lines;
   a plurality of scan lines;
   a substrate on which the data line and the scan lines are formed;
   a plurality of pixel elements arranged in the form of a pixel array and coupled to the corresponding data lines and the corresponding scan lines;
   a plurality of touch sensor electrodes arranged in the form of a sensor array;
   a touch gate pad formed on the substrate; and
   a plurality of first group switch transistors each comprising a plurality of first ends, a plurality of second ends and a plurality of control ends, wherein the first ends of each first group switch transistor are coupled to the touch sensor electrodes in a first group of a first column of the sensor array and a touch display driver, the second ends of each first group switch transistor are coupled to a first test pad, and the control ends of each first group switch transistor are coupled to the touch gate pad.

7. The touch display device according to claim 6, further comprising:
   a plurality of second group switch transistors each comprising a plurality of first ends, a plurality of second ends end and a plurality of control ends, wherein the first ends of each second group switch transistors are coupled to the touch sensor electrodes in a second group of the first column of the sensor array and the touch display driver, the second ends of each second group switch transistor are coupled to a second test pad, and the control ends of each second group switch transistors are coupled to the touch gate pad.

8. The touch display device according to claim 7, further comprising:

a plurality of third group switch transistors each comprising a plurality of first ends, a plurality of second ends and a plurality of control ends, wherein the first ends of each third group switch transistor are coupled to the touch sensor electrodes in a third group of the first column of the sensor array and the touch display driver, the second ends of each third group switch transistors are coupled to a third test pad, and the control ends of each third group switch transistors are coupled to the touch gate pad.

9. The touch display device according to claim 6, wherein the data lines comprise a first group, a second group and a third group, and the touch display device further comprises:

a display gate pad; and a plurality of display switch transistors each comprising a first end, a second end and a control end, wherein the first end of each display switch transistor is coupled to one of the data lines in the first group, one of the data lines in the second group or one of the data lines in the third group, the second end of each display switch transistor is coupled to the first test pad corresponding to the first group, a second test pad corresponding to the second group or a third test pad corresponding to the third group, and the control end of each display switch transistor is coupled to the display gate pad.

10. The touch display device according to claim 6, wherein the touch gate pad transmits a touch test signal to the first switch transistors in a first period to test the touch sensor electrodes in the first column, and the display gate pad transmits a display test signal to the display switch transistors in a second period to test the data lines.

* * * * *